United States Patent [19]
Sharp et al.

[11] Patent Number: 6,128,495
[45] Date of Patent: Oct. 3, 2000

[54] METHOD OF ROUTING CALLS IN A COMMUNICATIONS SYSTEM

[75] Inventors: Iain Sharp, Maidenhead, United Kingdom; James B Welling, Dallas; Bradford Clapp, Richardson, both of Tex.

[73] Assignee: Nortel Networks Corporation, Montreal, Canada

[21] Appl. No.: 09/077,809

[22] PCT Filed: Dec. 13, 1996

[86] PCT No.: PCT/GB96/03098

§ 371 Date: Nov. 12, 1998

§ 102(e) Date: Nov. 12, 1998

[87] PCT Pub. No.: WO97/23107

PCT Pub. Date: Jun. 26, 1997

[30] Foreign Application Priority Data

Dec. 15, 1995 [GB] United Kingdom ............... 9525750

[51] Int. Cl.⁷ .................................................. H04Q 7/20
[52] U.S. Cl. ..................... 455/445; 455/560; 455/414
[58] Field of Search .................................. 455/445, 430, 455/414, 432, 433, 560

[56] References Cited

U.S. PATENT DOCUMENTS

| | | | |
|---|---|---|---|
| 5,345,502 | 9/1994 | Rothenhöfer | 455/433 |
| 5,469,496 | 11/1995 | Emery et al. | 455/445 |
| 5,673,308 | 9/1997 | Akhavan | 455/445 |
| 5,920,816 | 7/1999 | Khan et al. | 455/445 |
| 5,926,760 | 7/1999 | Khan et al. | 455/445 |

FOREIGN PATENT DOCUMENTS

| | | | |
|---|---|---|---|
| 0 630 165 A2 | 4/1994 | European Pat. Off. | H04Q 7/04 |
| 93/18606 | 9/1993 | WIPO | H04M 11/00 |
| 95/26114 | 9/1995 | WIPO | H04Q 7/24 |

*Primary Examiner*—Fan Tsang
*Assistant Examiner*—Rafael Perez-Gutierrez
*Attorney, Agent, or Firm*—Lee, Mann, Smith, McWilliams, Sweeney & Ohlson

[57] ABSTRACT

A method of routing calls which require intelligent network (IN) services between a pair of subscribers, at least one of which subscribers is a mobile network subscriber. A mobile network (30) routes a call to an intelligent network (31) via a first path (32) to apply an IN service, and routes the call back to the mobile network via a second (33) or a third (34) path. Calls routed via the second path (33) are completed to the called party. Calls routed via the third path (34) may require further routing to the IN (31) prior to completion, such as where a different called party is involved or where a terminating IN service may be needed.

14 Claims, 7 Drawing Sheets

METHOD OF ROUTING CALLS IN A COMMUNICATIONS SYSTEM

TECHNICAL FIELD

This invention relates to the provision of intelligent network (IN) services to subscribers of a mobile communications system.

BACKGROUND OF THE INVENTION

Wireless communications systems for mobile subscribers, such as the Global System for Mobile Communications (GSM) cellular system, are well established. In fixed networks it is known to provide subscribers with special services such as Freephone, call forwarding and call barring. These call control services are provided by an intelligent network (IN) which forms an additional layer of the network. By separating some of the call control functions from network switches, services can be developed and applied independently. An intelligent network comprises a number of Service Switching Points (SSPs) which are linked to Service Control Points (SCPs). The SSPs are programmed to recognise 'trigger' events, such as a particular pattern of digits (e.g. 0800 for Freephone), and to refer any calls in which a trigger occurs to the SCPs to apply the required service.

It is now intended to provide IN services to mobile subscribers, which requires physical linking of the Public Land Mobile Network (PLMN) to an IN, and establishing protocols to ensure that calls requiring IN services are correctly routed.

Some known arrangements for providing intelligent network services to subscribers of a mobile network are shown in U.S. Pat. No. 5,345,502 (Rothenhöfer) and European Patent Application EP 0 630 165 A2 (Alcatel).

International Patent Application WO 95/26114 relates to an intelligent mobile telecommunications network with communication between a logical node of an intelligent network and a logical node of a mobile network.

International Patent Application WO 93/18606 describes an Advanced Intelligent Network (AIN) wireline system which connects to and controls processing of calls to a Personal Communications Service subscriber's wireless handset.

There have been some problems with routing calls between mobile and intelligent networks, which has resulted in calls being incorrectly completed. There is a particular problem where the application of an IN service on the terminating leg of a call requires a call to be completed to the originally called party. The mobile network may repeatedly route the same call to the IN in an infinite loop.

It is an object of the present invention to minimise or overcome these routing problems for calls requiring intelligent network (IN) services.

SUMMARY OF THE INVENTION

According to the present invention there is provided a method of routing calls which require intelligent network (IN) services between a pair of subscribers, at least one of which subscribers is a mobile network subscriber, the method including routing a call from a mobile network to an intelligent network via a first path to apply an IN service, and routing the call back to the mobile network via a second path or a third path, wherein calls routed via the second path are completed to the called party without further routing to the IN, and wherein for calls routed via the third path the mobile network determines whether a further routing of the calls to the IN is required prior to completion.

This provides a mechanism for enabling the mobile network to differentiate calls which do not require further routing to the IN. Thus infinite routing loops can be avoided. It is achieved in a manner which can avoid changes to the signalling between the IN and mobile networks.

Preferably each path is a separate trunk or a group of trunk lines.

Preferably calls are routed via the third path if the intelligent network determines that, as a result of applying a terminating IN service, a new called party is involved. This enables calls to be routed to an IN for services to which the new called party subscribes.

Calls are routed via the third path if the intelligent network applies an originating IN service for a calling party and where subsequent routing to the IN may be required to apply a terminating IN service. This enables calls to be routed back to an IN where required without risking infinite loops.

Preferably the IN passes a called party identifier to the mobile network via the third path, and receiving the identifier information on that path triggers the mobile network to interrogate a register for IN services associated with that identifier, and if there are services associated with that identifier, the mobile network makes a further routing to the IN to apply those services. This enables the mobile network to make an appropriate routing decision.

According to another aspect of the invention there is provided a communications system incorporating a mobile communications network and an intelligent network (IN), parts of the respective networks being linked by first, second and third paths, the first path being arranged to route calls to the IN for applying an IN service, and the second and third paths being arranged to route calls back to the mobile network, the second path carrying calls requiring completion to a called party, without further routing to the IN, and the third path carrying calls for which the mobile network determines whether further routing to the IN is required prior to completion.

According to a further aspect of the invention there is provided a mobile communications network for use in a communications system incorporating the mobile communications network and an intelligent network (IN), the mobile communications network being arranged to link to the intelligent network by first, second and third paths, the first path being arranged to route calls to the IN for applying an IN service, and the second and third paths being arranged to receive calls back from the intelligent network, the second path carrying calls requiring completion to a called party, without further routing to the IN, and the third path carrying calls for which the mobile network determines whether further routing to the IN is required prior to completion.

According to a still further aspect of the invention there is provided an intelligent network (IN) for use in a communications system incorporating a mobile communications network and the intelligent network, the intelligent network being arranged to link to the mobile communications network by first, second and third paths, the first path being arranged to receive calls from the mobile network for applying an IN service, and the second and third paths being arranged to route calls back to the mobile network, the second path carrying calls requiring completion to a called party, without further routing to the IN, and the third path carrying calls for which the mobile network determines whether further routing to the IN is required prior to completion.

BRIEF DESCRIPTION OF THE DRAWINGS

An embodiment of the invention will now be described, by way of example only, with reference to the accompanying drawings, in which.

DESCRIPTION OF PREFERRED EMBODIMENT

The invention is described with reference to the GSM cellular mobile communications system, although it will be evident that the teaching is applicable to other mobile communications systems.

Figure 1:
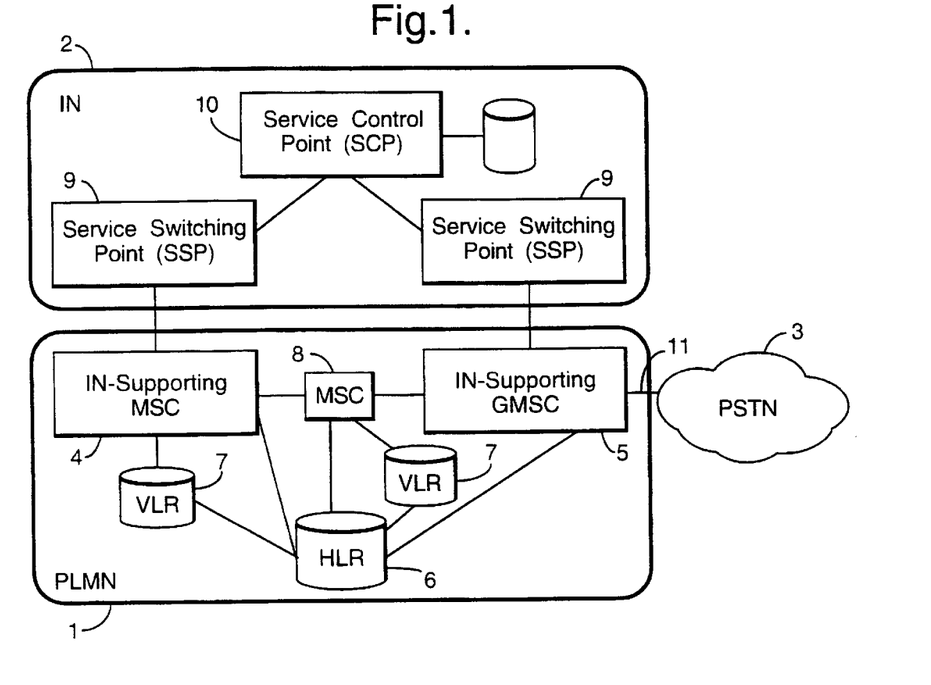
FIG. 1 is a schematic diagram of a mobile network linked to an intelligent network.

FIG. 1 shows a Public Land Mobile Network (PLMN) 1 linked to an intelligent network 2. The mobile network 1 comprises a Gateway Mobile Services Switching Centre (GMSC) 5 linked to the Public Switched Telephone Network (PSTN) 3 in addition to other Mobile Services Switching Centres (MSCs) 4 and 8. A Home Location Register (HLR) 6 maintains a record for each mobile subscriber, and each MSC stores details of subscribers visiting their service area in a Visitors Location Register (VLR) 7. To support IN services, some of the MSCs 4, 5 are linked to Service Switching Points (SSPs) 9 of IN 2. IN services are defined in, and applied by, SCPs 10 in the IN. A call requiring an IN service is routed from an MSC (4) of the mobile network to a SSP (9) and from there on to a SCP 10 of the IN network before it is passed back to the mobile network.

Figure 2:
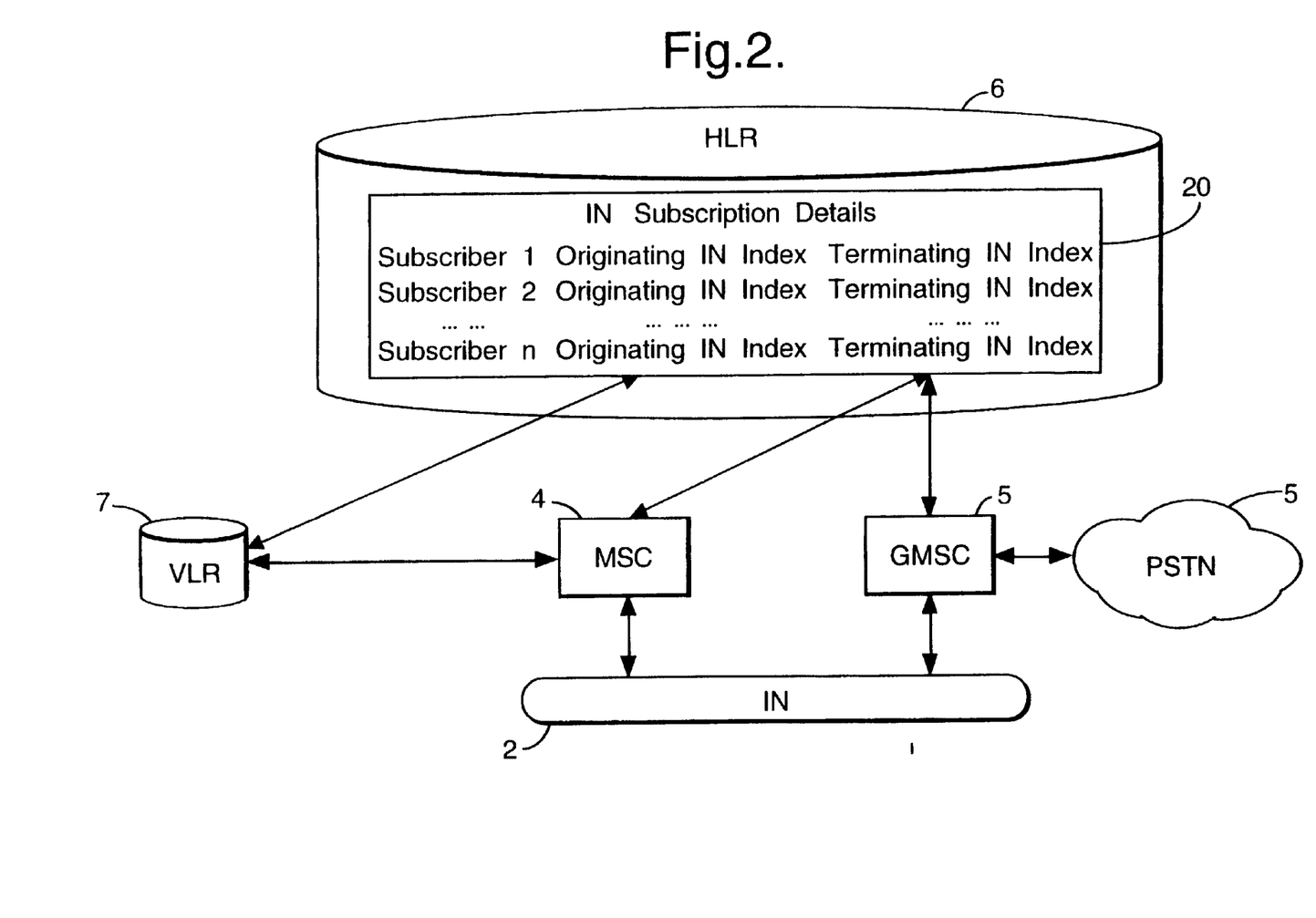
FIG. 2 is a more detailed view of the mobile network of FIG. 1.

FIG. 2 shows the mobile network of FIG. 1 in more detail. HLR 6, in addition to storing the usual information about each subscriber, such as their location, maintains a record 20 of each subscriber's IN service requirements. This includes details of originating IN services (services required when a subscriber makes a call) such as private numbering plans, and terminating IN services (services required when a subscriber receives a call) such as call forwarding and call screening. These are stored as an originating IN index and a terminating IN index. These indexes may be copied to other parts of the mobile network e.g. VLRs 7 when the information is required.

As an example, when a subscriber roams into the service area of a new MSC, information about the subscriber is copied from the HLR 6 into the VLR 7 of the new MSC 4 so that it may be accessed when the subscriber makes a call. This information includes the IN originating index, which is used by the MSC 4 to route calls to the IN 2.

When a call terminates to a subscriber who uses IN services, the call may be routed to the IN before completion. The MSC requests the subscriber's terminating IN index from the HLR by adding an 'IN screening indicator' to the usual Send Routing Information (SRI) message. To route a call after a service has been applied, no 'IN screening indicator' is sent.

The mobile network and intelligent network are joined by trunks which connect MSCs (or GMSCS) of the PLMN to SSPs of the IN. Any trunking capable of supporting Integrated Service Digital Network User Part (ISUP) messages or MF signalling may be used.

Figure 3:
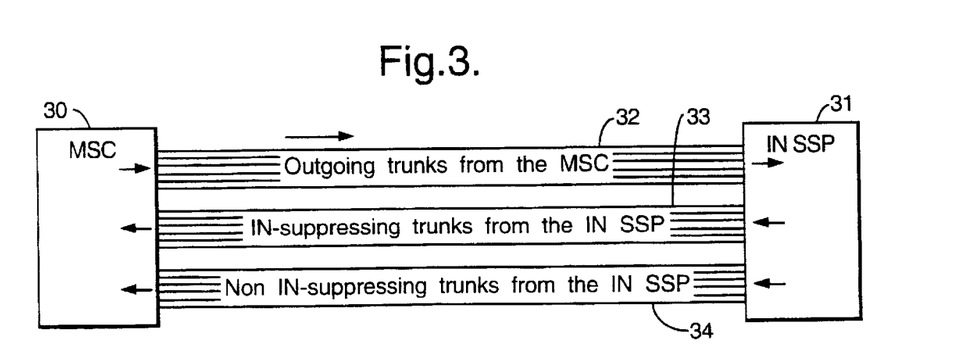
FIG. 3 is a more detailed view of the trunking between the mobile and intelligent networks of FIGS. 1 and 2.

Referring to FIG. 3, three types of trunk connect (G)MSCs to SSPs. Preferably a plurality of each type of trunk is provided, sufficient to accommodate an expected traffic demand. Firstly, outgoing trunk 32 routes calls from an MSC 30 to an SSP 31. Calls are returned from an SSP 31 on one of two types of return trunk 33, 34. The type of trunk which is used triggers different responses from the MSC 30. A first type of return trunk is an 'IN-suppressing trunk'. On receiving a call back from the SSP on an 'IN-suppressing trunk', the MSC will attempt to complete the call to the called party, i.e. further references to the IN are suppressed. This trunk is used when the IN has applied a terminating service and the call has to be completed to the called party.

A second type of return trunk is a 'Non IN-suppressing trunk'. On receiving a call back from the SSP on a non IN-suppressing trunk, the MSC responds by interrogating the HLR to find out whether the called party subscribes to a terminating IN service. This trunk is used when:

the IN has applied an originating service for the calling party and is now routing the call to the called party. A terminating IN service for the called party may be applied.

the IN has determined that the call should be completed to a new called party, e.g. after applying a call forwarding service. The new called party may also subscribe to a terminating IN service which should be applied before the call is completed.

This will become clearer when some examples are worked through.

A trunk may connect an MSC to an IN SSP directly, or via tandem MSCs. Connections made through tandem MSCs use nailed-up connections where the tandem MSCs route the call through without performing switching.

Message flows between elements of the mobile and intelligent networks will now be explained in more detail.

Figure 4:
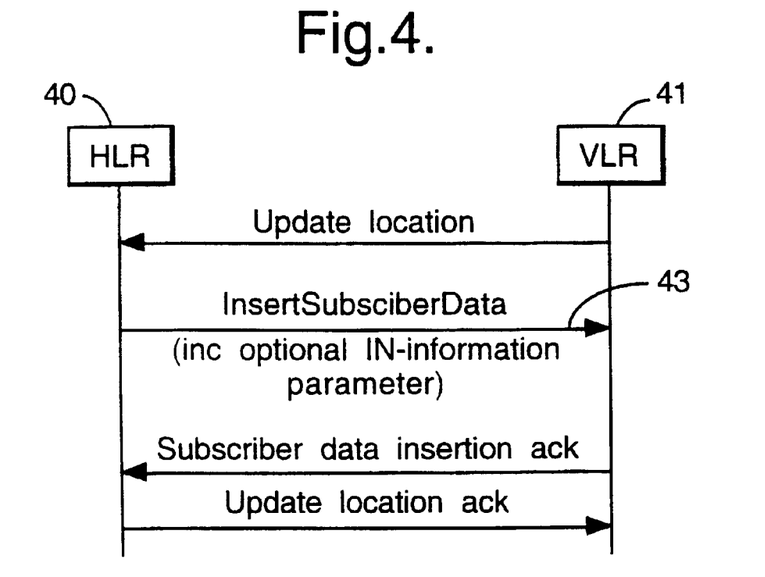
FIGS. 4 and 5 shows message flows between parts of the mobile network.
Figure 5:
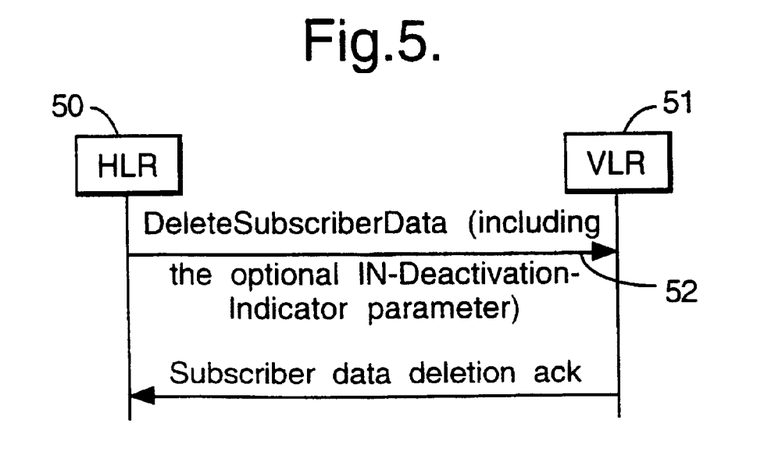

FIGS. 4 and 5 show the message flows between a HLR 40 and VLR 41 which take place as a mobile subscriber moves into and out of the service area of a MSC. When a VLR requests information about a subscriber, the HLR responds with an 'Insert Subscriber Data' message 43 which includes an IN index if the subscriber uses IN services. Subscriber data (including the IN index) may be deleted by a 'Delete Subscriber Data' message. 52.

Figure 6:
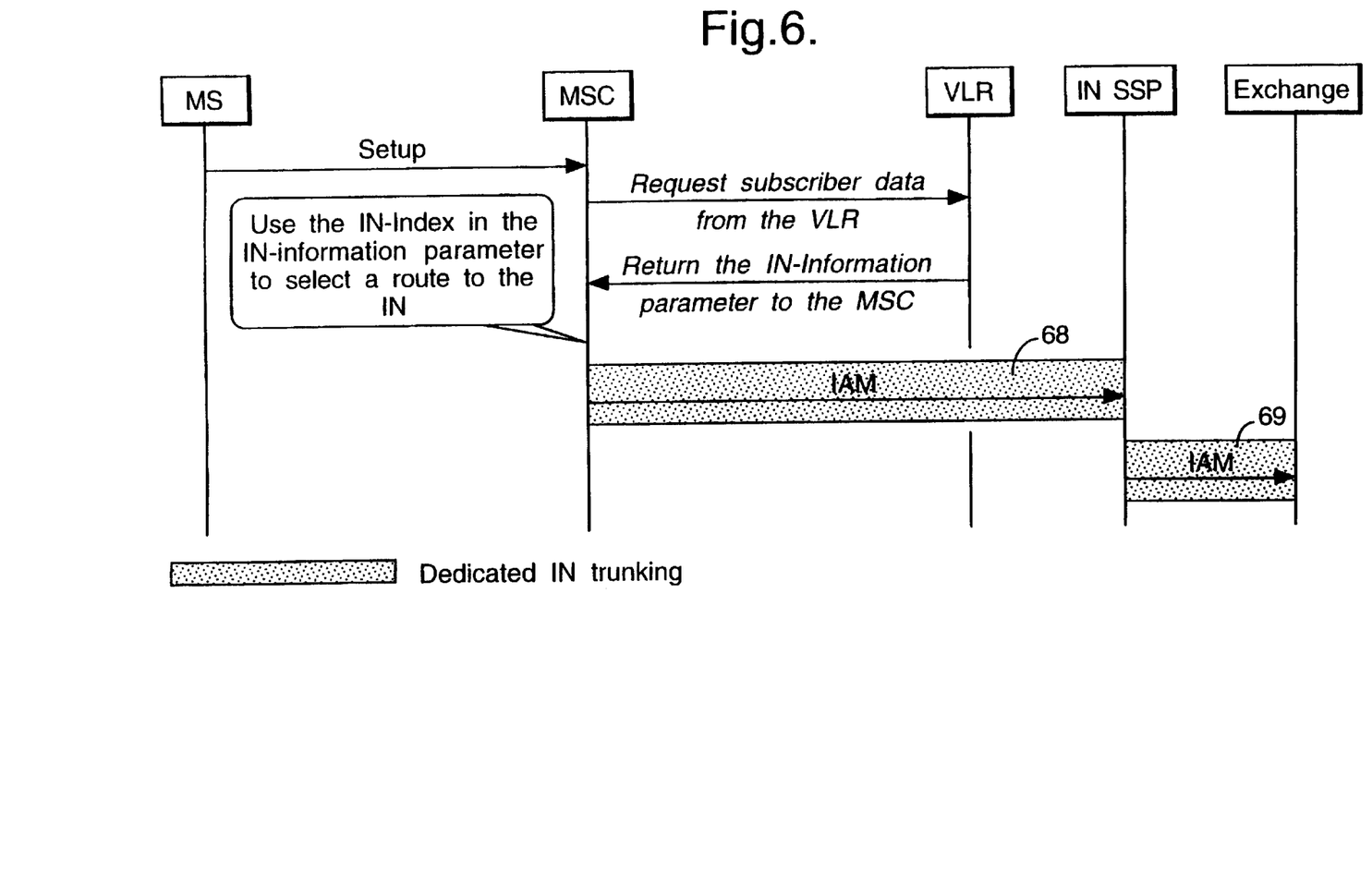
FIG. 6 shows message flows for a call originated by a mobile.

FIG. 6 shows the message flows when a mobile subscriber (MS) originates a call and requires an IN service. At call set-up, the MSC interrogates the VLR (which maintain details of subscribers) to determine whether the call needs to be routed to the IN. Using the originating IN index as a key, MSC selects a route to the IN. MSC sends an Initial Address Message (IAM) 68 to the IN SSP on a dedicated IN trunk.

The IAM 68 contains the original dialled number and the identity, or Mobile Station ISDN (MSISDN), of the calling party. The IN applies whatever IN services have been requested, based upon the service profile of the calling party. Applying the IN service may cause the call to be routed to a party inside or outside of the mobile network, routed to another node for a special service (e.g. voice-mail) or treated and taken down by the IN. If the call is routed to a called party, a further IAM 69 is generated and routed to the appropriate exchange on a non IN-suppressing trunk.

Figure 7:
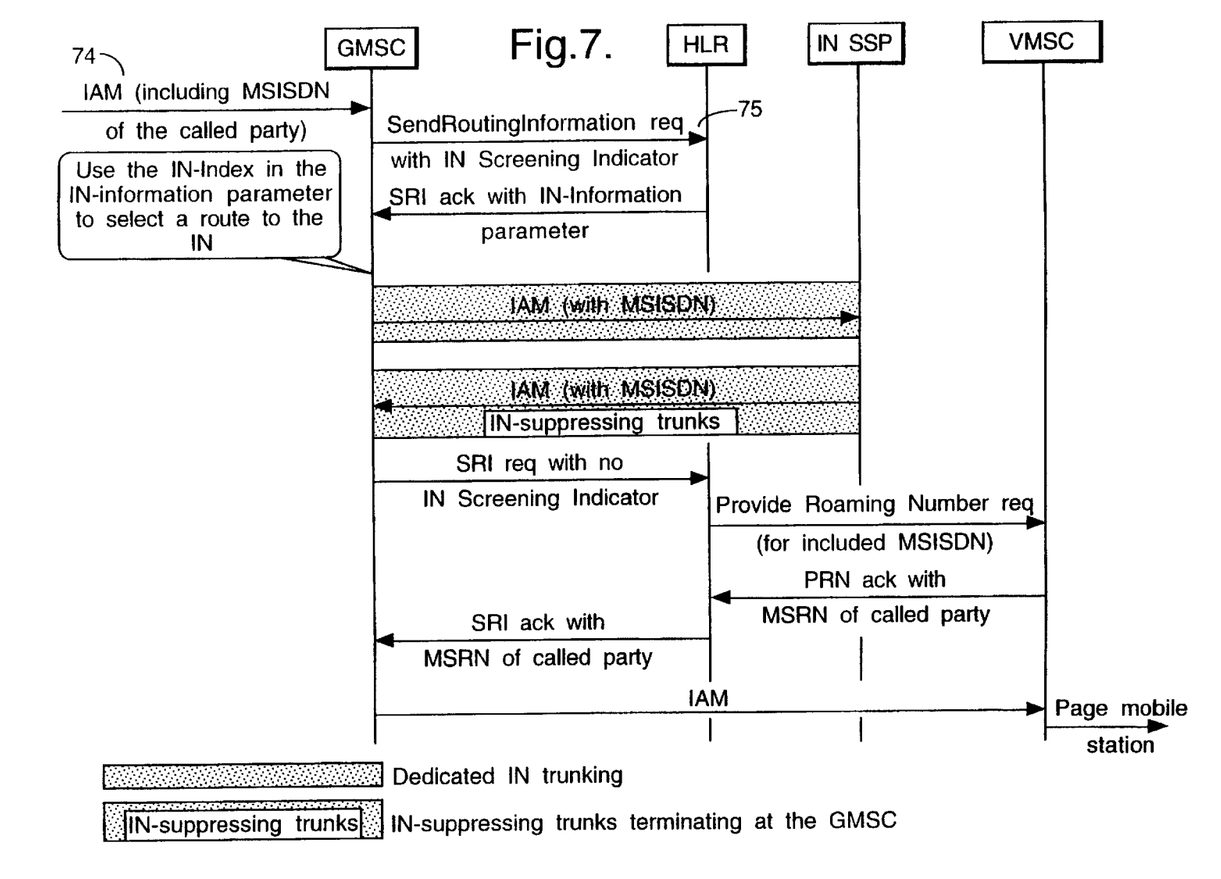
FIGS. 7 and 8 show message flows for a call terminated to a mobile.
Figure 8:
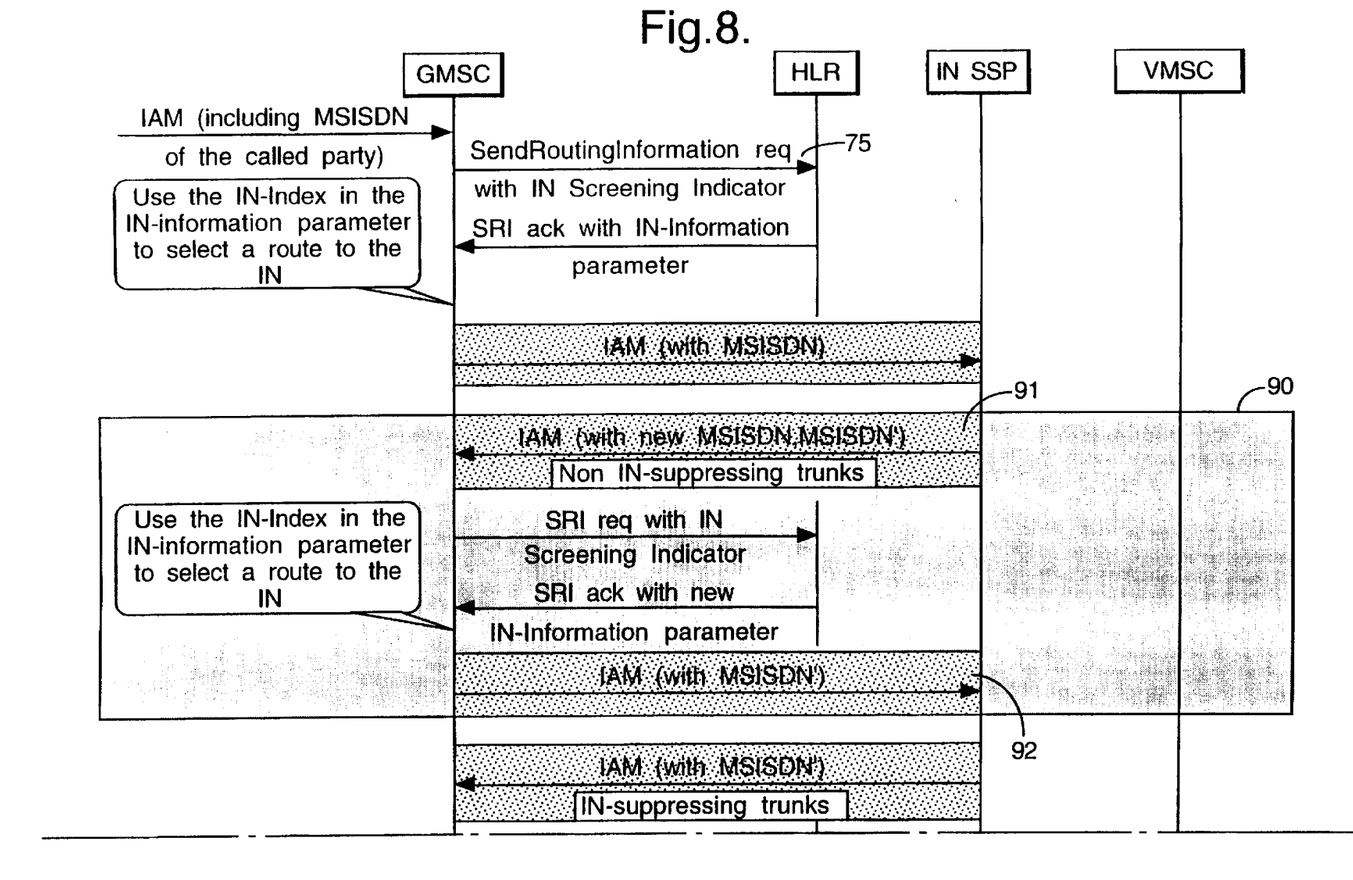

FIGS. 7 and 8 show message flows involved for the terminating leg of a call, when a call is routed by the mobile network, via the IN, to a subscriber. When a call first arrives in the mobile network at a Gateway MSC (GMSC), the GMSC interrogates the HLR to find out the service profile of the called party. If the called party subscribes to IN services, the HLR copies the terminating IN index to the GMSC, which is used by the GMSC to route the call to the IN. If the GMSC does not support IN services, the subscriber will lose the IN service. Calls may terminate at the GMSC on a trunk from the PSTN (see FIGS. 1, 11), on a standard CCS 7 trunk in the PLMN, or on a non-IN suppressing trunk from an IN SSP.

Calls may terminate at the party who was originally called, after a routing to the IN to apply a termination IN service, as shown in FIG. 7. Alternatively, applying the IN service may cause the calls to be routed to a different called party (e.g. due to call-forwarding), as shown in FIG. 8.

Referring first to FIG. 7, where the call terminates at the party who was originally called. On receiving an IAM message 74, the GMSC interrogates 75 the HLR for details of the IN services to which the called party subscribes (their terminating IN index). If the called party does not subscribe to IN services, the call is routed in the standard manner. However, if the called party does subscribe to IN services, the GMSC uses the IN index to route the call to the relevant IN SSP. After applying the terminating IN service, the IN determines that the call needs to be routed to the same called party and returns an IAM to the GMSC on an IN-suppressing trunk, to prevent the GMSC routing the call back to the IN. The GMSC then interrogates the HLR for the location of the mobile within the network and attempts to route the call.

FIG. 8 shows message flows in the situation where a call is terminated to a party different to that originally called. Box 90 highlights the new steps in the routing, which are necessary to discover the service profile of the new called party.

The IN returns an IAM 91 to the GMSC which contains the new MSISDN. This is sent over a non IN-suppressing trunk, which triggers the GMSC to interrogate the HLR for the IN service profile of the new called party. If the new called party subscribes to IN services then the call is routed to the IN once again 92 to apply the IN service for the new called party. The SSP used for this second routing to the IN may be a different one to that used before. Thereafter the call is routed as before.

What is claimed is:

1. A method of routing calls which require intelligent network (IN) services between a pair of subscribers, at least one of which subscribers is a mobile network subscriber, the method including routing a call from a mobile network to an intelligent network via a first path to apply an IN service, and routing the call back to the mobile network via a second path or a third path, wherein calls routed via the second path are completed to the called party without further routing to the IN, and wherein for calls routed via the third path the mobile network determines whether a further routing of the calls to the IN is required prior to completion.

2. A method according to claim 1 wherein each path is a separate trunk or group of trunk lines.

3. A method of routing calls according to claim 1 wherein calls are routed via the third path if the IN applies an originating IN service for a calling party and where subsequent routing to the IN may be required to apply a terminating IN service.

4. A method of routing calls according to claim 1 wherein calls are routed via the third path if the IN determines that, as a result of applying a terminating IN service, a new called party is involved.

5. A method according to claim 1, wherein the IN passes a called party identifier to the mobile network via the third path, and receiving the identifier information on that path triggers the mobile network to interrogate a register for IN services associated with that identifier, and if there are services associated with that identifier, the mobile network makes a further routing to the IN to apply those services.

6. A method according to claim 2, wherein the IN passes a called party identifier to the mobile network via the third path, and receiving the identifier information on that path triggers the mobile network to interrogate a register for IN services associated with that identifier, and if there are services associated with that identifier, the mobile network makes a further routing to the IN to apply those services.

7. A method according to claim 3, wherein the IN passes a called party identifier to the mobile network via the third path, and receiving the identifier information on that path triggers the mobile network to interrogate a register for IN services associated with that identifier, and if there are services associated with that identifier, the mobile network makes a further routing to the IN to apply those services.

8. A method according to claim 4, wherein the IN passes a called party identifier to the mobile network via the third path, and receiving the identifier information on that path triggers the mobile network to interrogate a register for IN services associated with that identifier, and if there are services associated with that identifier, the mobile network makes a further routing to the IN to apply those services.

9. A communications system incorporating a mobile communications network and an intelligent network (IN), parts of the respective networks being linked by first, second and third paths, the first path being arranged to route calls to the IN for applying an IN service, and the second and third paths being arranged to route calls back to the mobile network, the second path carrying calls requiring completion to a called party, without further routing to the IN, and the third path carrying calls for which the mobile network determines whether further routing to the IN is required prior to completion.

10. A communications system according to claim 9, wherein each path is a separate trunk or group of trunk lines.

11. A mobile communications network for use in a communications system incorporating the mobile communications network and an intelligent network (IN), the mobile communications network being arranged to link to the intelligent network by first, second and third paths, the first path being arranged to route calls to the IN for applying an IN service, and the second and third paths being arranged to receive calls back from the intelligent network, the second path carrying calls requiring completion to a called party, without further routing to the IN, and the third path carrying calls for which the mobile network determines whether further routing to the IN is required prior to completion.

12. A mobile communications network according to claim 11, wherein each path is a separate trunk or group of trunk lines.

13. An intelligent network (IN) for use in a communications system incorporating a mobile communications network and the intelligent network, the intelligent network being arranged to link to the mobile communications network by first, second and third paths, the first path being arranged to receive calls from the mobile network for applying an IN service, and the second and third paths being arranged to route calls back to the mobile network, the second path carrying calls requiring completion to a called party, without further routing to the IN, and the third path carrying calls for which the mobile network determines whether further routing to the IN is required prior to completion.

14. An intelligent network according to claim 13, wherein each path is a separate trunk of group of trunk lines.

* * * * *